United States Patent [19]
Handzlik

[11] 3,779,585
[45] Dec. 18, 1973

[54] SEALING MEANS FOR AN APERTURE IN A PANEL OR THE LIKE

[75] Inventor: Anthony T. Handzlik, Milwaukee, Wis.

[73] Assignee: Vilter Manufacturing Corporation, Milwaukee, Wis.

[22] Filed: Nov. 17, 1972

[21] Appl. No.: 307,399

[52] U.S. Cl. ................ 285/158, 174/65 R, 248/56
[51] Int. Cl. ............................................. F16l 3/04
[58] Field of Search ................ 285/158, 192; 16/2; 248/56; 174/65 R

[56] References Cited
UNITED STATES PATENTS

| | | | |
|---|---|---|---|
| 1,952,695 | 3/1934 | Webb et al. | 285/177 X |
| 2,276,969 | 3/1942 | Heinichen | 285/158 |
| 2,406,852 | 9/1946 | Relf | 285/192 X |
| 2,735,697 | 2/1956 | Zanin | 285/177 |

*Primary Examiner*—Dave W. Arola
*Attorney*—James E. Nilles

[57] ABSTRACT

Sealing means for forming a seal between an aperture in a panel or the like and a conduit or the like which passes through said aperture. The sealing means includes a compressible grommet located in the aperture and having adjacent washers alongside the grommet. The washers have peripheral slots which extend inwardly at different angles and in which slots the conduit is located, thus, the washers abutting against one another with their differently inclined slots act to generally close off each other's slots and the washers are compressed against the grommet so the latter seals against the aperture in the panel.

4 Claims, 2 Drawing Figures

SEALING MEANS FOR AN APERTURE IN A PANEL OR THE LIKE

BACKGROUND OF THE INVENTION

The invention pertains to mechanical sealing devices for providing a seal between a conduit, tube, or the like which must be passed through a relatively large opening in a wall or panel and then sealed in respect thereto. Various shutters or adjustable shields have been proposed for such purpose, but have generally not proved to be efficient in effecting a seal, easily installed or disassembled when it is desired to remove the conduit or tube.

SUMMARY OF THE INVENTION

The present invention provides a sealing means for forming a seal between an aperture in a panel or the like and a conduit or the like which passes through the aperture, said means comprising a flexible and compressible grommet which is located in the aperture and through which the conduit rather snugly passes. The invention also includes a plurality of washers located adjacent the grommet, at least two of which washers abut against one another and have differently inclined, peripheral slots through which the conduit also passes. The arrangement is such that means are provided for compressing the washers together and against the grommet to thereby cause the washers to generally close the slot of its adjacent washer and furthermore to cause the grommet to be compressed into sealing relationship with the panel and the conduit passing therethrough.

By means of the present invention, a conduit having a relatively large object, such as a switch can be inserted in the aperture and for example, into a control box, and then an efficient seal provided between the conduit and the panel through which it passes.

Any number of conduits can be sealed with the panel simply by providing a corresponding number of slots in the washers. It is an easy matter to simply slip the slots of the washers over the conduit, and preferably on either side of the grommet, and then draw the washers and grommet tightly together by compression means, such as a threaded bolt or the like.

These and other objects and advantages of the present invention will appear hereinafter as this disclosure progresses, reference being had to the accompanying drawings.

DESCRIPTION OF A PREFERRED EMBODIMENT

Figures 1, 2:
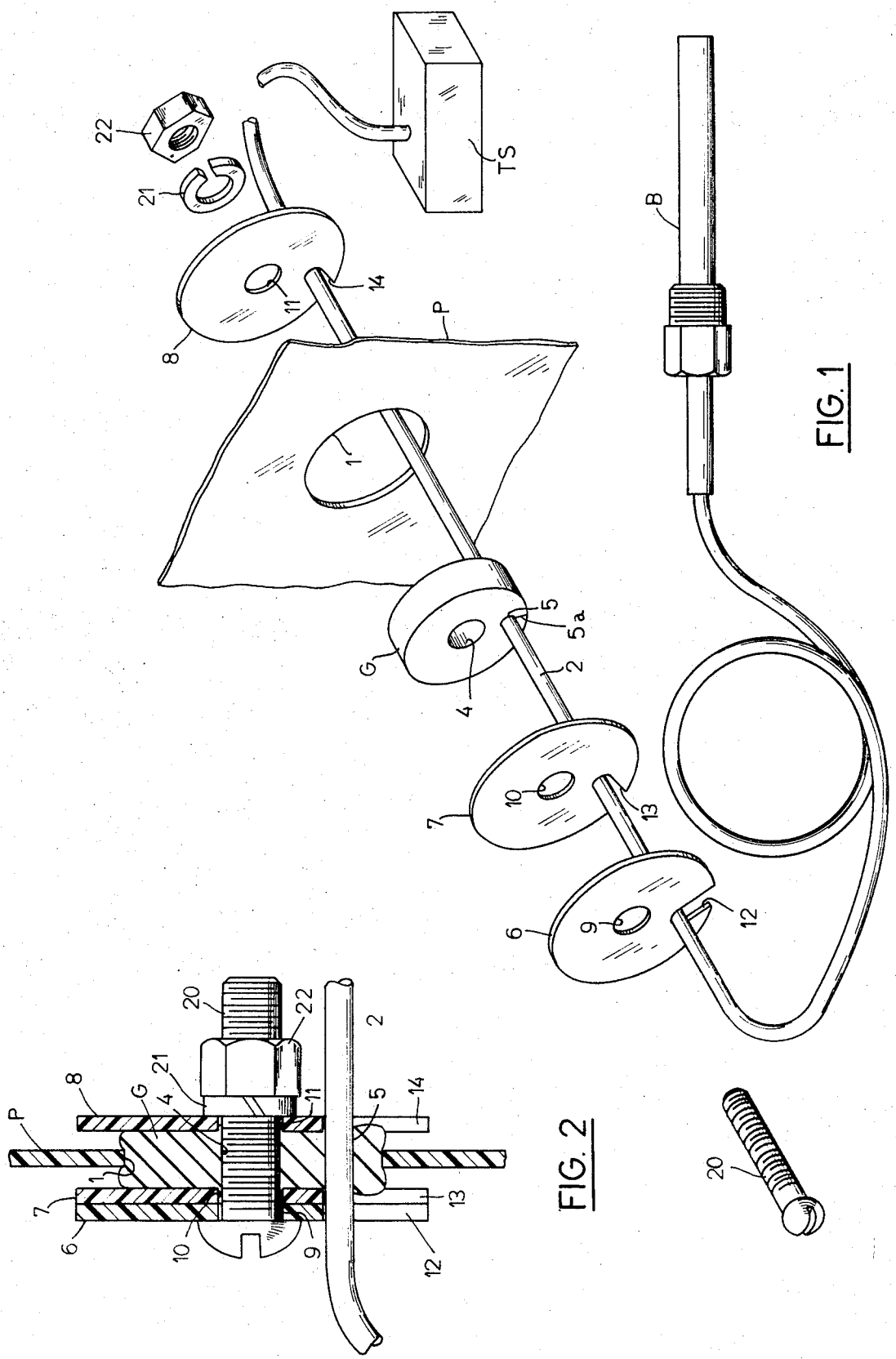
FIG. 1 is a perspective, exploded view of sealing means made in accordance with the present invention and in connection with a panel having an aperture therethrough.
FIG. 2 is a sectional view through the sealing means shown in FIG. 1, but when the latter has been assembled and furthermore, on an enlarged scale from that shown in FIG. 1.

The invention will be shown and described in connection with a panel P, of a control box for example, which may be of any type and which box has a temperature switch TS inside. The switch TS has a conduit 2 attached to it which extends through the aperture 1 and out of the control box and is connected to a sensing bulb B located outside the control box and in piping, for example. After the bulb and conduit are strung through the aperture 1 in the panel, the relatively small diameter capillary tubing 2 or conduit is sealed in the panel as follows.

A flexible compression grommet G, for example made of rubber, is of the same diameter as the aperture 1 and has a generally centrally located hole 4 extending therethrough and also has a smaller hole 5 extending therethrough. The hole 5 is of a diameter which is approximately the same as the diameter of the conduit 2 extending through the hole 5. A slit 5a extends non-radially from the hole 5 to the periphery of the grommet.

In assembling the sealing means, the grommet G is inserted in the aperture 1 with the conduit 2 having been passed through slit 5a and located in hole 5, and a series of washers 6, 7 and 8, each having a generally central opening 9, 10, and 11, respectively, are placed on opposite sides of the grommet G. Washers 6, 7 and 8 are of a greater diameter than the flexible grommet. The washers 6, 7 and 8 each have a slot 12, 13 and 14, respectively which extend from the periphery of their washer and inwardly at an angle which is inclined to the radius of the washer. More specifically, the slots of adjacent washers are inclined at different angles and terminate in slot ends, which ends are in alignment with one another and with the hole 5 of the grommet. The conduit 2 is inserted in the slot ends.

It will be noted that the angles of the slots of adjacent washers are inclined at different angles to one another and therefore the washers overlap a portion of the slot of the adjacent washer. Thus, the washers overlap one another adjacent their slotted portions and thereby generally close around the conduit 2. This prevents the compressible grommet from extruding through the slots when the grommet is compressed, as follows.

The washers are simply slipped on the capillary tube, on either side of the grommet and the washers are then compressed against the grommet so as to compress and slightly deform the grommet into sealing relationship with the panel and also with the conduit 2. This compression is accomplished by means of the bolt 20, lock washer 21 and nut 22, the bolt extending through the centrally disposed and aligned openings in the washers and the grommet. Tightening of the nut on the bolt causes the grommet to be compressed thus effecting a tight seal between the conduit 2 and the panel P.

It will be noted that only one washer 8 is used on the inside of the panel because in some installations the extrusion of the grommet through the washer slot is not particularly objectionable inside the control box.

If more than one conduit 2 is to be passed through the aperture 1 in the panel P, the washers may each have a number of slots coinciding with the number of conduits to be inserted through aperture 1.

While the term "conduit" has been used in the above description, it should be recognized that the sealing means is applicable to any form of rod-like member or the like which must be passed through a relatively large aperture and sealed therewith.

I claim:

1. Sealing means for forming a seal between an aperture in a panel or the like and a conduit or the like which passes through said aperture, said means comprising, a compressible grommet of a size which can be inserted in and substantially fills said aperture, a hole through said grommet and through which said conduit passes, a plurality of washers each having a slot therein which extends from the periphery of said washer and inwardly at an angle inclined to the radius of said washer and terminating in a slot end, said slot ends being in axial alignment with each other and also with said grommet hole and said conduit being located in said slot ends, the slots of adjacent washers being inclined at different directions from one another whereby adjacent washers abut against one another and overlap a portion of each others slots, said washers and grommet also each having a generally central opening extending therethrough and in alignment, and means extending through said aligned openings for compressing said washers and grommet together to create a seal between said panel and conduit.

2. The sealing means set forth in claim 1 further characterized in that said washers are of a greater diameter than said grommet.

3. The sealing means set forth in claim 1 further characterized in that said washers are located on each side of said grommet.

4. The sealing means set forth in claim 2 further characterized in that said washers are located on each side of said grommet.

* * * * *